United States Patent
Iwashita et al.

(10) Patent No.: US 10,247,301 B2
(45) Date of Patent: Apr. 2, 2019

(54) SERVO CONTROL SYSTEM WITH POSITION COMPENSATION FUNCTION FOR DRIVEN MEMBER

(71) Applicant: FANUC CORPORATION, Minamitsuru-gun, Yamanashi (JP)

(72) Inventors: Yasusuke Iwashita, Yamanashi (JP); Kenichi Takayama, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 449 days.

(21) Appl. No.: 14/093,372

(22) Filed: Nov. 29, 2013

(65) Prior Publication Data
US 2014/0156080 A1 Jun. 5, 2014

(30) Foreign Application Priority Data
Nov. 30, 2012 (JP) .................. 2012-262172

(51) Int. Cl.
| | |
|---|---|
| H02P 6/18 | (2016.01) |
| F16H 61/02 | (2006.01) |
| H02P 23/00 | (2016.01) |
| G05B 19/404 | (2006.01) |
| H02P 1/00 | (2006.01) |

(52) U.S. Cl.
CPC ....... *F16H 61/0202* (2013.01); *G05B 19/404* (2013.01); *H02P 23/00* (2013.01); *G05B 2219/41138* (2013.01); *H02P 1/00* (2013.01)

(58) Field of Classification Search
CPC .................. H02P 3/12; H02P 3/14; H02P 6/16
See application file for complete search history.

(56) References Cited

U.S. PATENT DOCUMENTS

| | | | | |
|---|---|---|---|---|
| 5,598,077 A | * | 1/1997 | Matsubara | G05B 19/404 |
| | | | | 318/568.22 |
| 7,102,315 B2 | * | 9/2006 | Nakata | B25J 9/1633 |
| | | | | 318/568.22 |

(Continued)

FOREIGN PATENT DOCUMENTS

| | | |
|---|---|---|
| CN | 1527170 A | 9/2004 |
| CN | 101256403 A | 9/2008 |

(Continued)

OTHER PUBLICATIONS

Office Action dated Jun. 17, 2014, corresponds to Japanese patent application No. 2012-262172.

*Primary Examiner* — Bickey Dhakal
*Assistant Examiner* — Charles S Laughlin
(74) *Attorney, Agent, or Firm* — Hauptman Ham, LLP (57) ABSTRACT

A servo control system including a servo motor, a driven member driven, a coupling mechanism coupled with the servo motor and the driven member, and a motor control part controlling the servo motor. The motor control part includes a position command generating part generating a position command value of the driven member, a force estimating part estimating the drive force acting on the driven member, a compensating part compensating the position command value based on the drive force estimated by the force estimating part, and a control signal output part outputting a control signal to the servo motor based on a position command value compensated by the compensating part.

6 Claims, 8 Drawing Sheets

(56) References Cited

U.S. PATENT DOCUMENTS

| | | | | |
|---|---|---|---|---|
| 7,205,743 B2* | 4/2007 | Iwashita | ............... | G05B 19/404 |
| | | | | 318/432 |
| 7,795,834 B2* | 9/2010 | Norihisa | ................ | H02P 23/18 |
| | | | | 318/560 |
| 2004/0180606 A1* | 9/2004 | Iwashita | ................... | H02P 5/52 |
| | | | | 451/5 |

FOREIGN PATENT DOCUMENTS

| | | |
|---|---|---|
| CN | 102545765 A | 7/2012 |
| JP | 11-345025 A | 12/1999 |
| JP | 2000-172341 | 6/2000 |
| JP | 2001175313 A | 6/2001 |
| JP | 2001202136 A | 7/2001 |
| JP | 200376425 A | 3/2003 |
| JP | 2003303022 A | 10/2003 |
| JP | 2004234205 A | 8/2004 |
| JP | 2004288164 A | 10/2004 |
| JP | 201079845 A | 4/2010 |
| WO | 95/05703 A1 | 2/1995 |

* cited by examiner

SERVO CONTROL SYSTEM WITH POSITION COMPENSATION FUNCTION FOR DRIVEN MEMBER

RELATED APPLICATIONS

The present application is a continuation of Application Number 2012-262172 filed Nov. 30, 2012, the disclosure of which is hereby incorporated by reference herein in its entirety.

BACKGROUND OF THE INVENTION

1. Field of the Invention

The present invention relates to a servo control system with a function for compensating the position of a driven member which is driven by power of a servo motor.

2. Description of the Related Art

A servo control system is known from the past, which compensates a position command value of a servo motor which operates in accordance with the position command value so as to raise the positional precision of a driven member which is driven by the servo motor. For example, the system which is described in Japanese Patent Publication No. 3621278 (JP3621278B) multiplies the torque command value which corresponds to the torque which the servo motor generates, that is, the total torque command value determined by adding the feedback torque command value and the feedforward torque command value, with a predetermined constant, and adds this multiplied signal with the position command value so as to compensate the position command value.

The system described in JP3621278B multiplies the torque of the servo motor (total torque command value) with the constant to compensate the position command value, and does not consider the disturbance between the servo motor and the driven member (frictional force, etc.). Therefore, when the disturbance greatly changes, it is difficult to precisely compensate the position command value.

SUMMARY OF INVENTION

A servo control system of one aspect of the present invention includes a servo motor, a driven member driven by the servo motor, a coupling mechanism coupled with the servo motor and the driven member, the coupling mechanism using the servo motor as a power source to generate a drive force acting on the driven member at a coupling part of the driven member and the coupling mechanism, and a motor control part controlling the servo motor. The motor control part includes a position command generating part generating a position command value of the driven member, a force estimating part estimating the drive force acting on the driven member at the coupling part, a compensating part compensating the position command value generated by the position command generating part based on the drive force estimated by the force estimating part, and a control signal output part outputting a control signal to the servo motor based on a position command value compensated by the compensating part.

BRIEF DESCRIPTION OF THE DRAWINGS

The object, feature, and advantages of the present invention will become clearer from the following explanation of embodiments given in relation to the attached drawings. In the attached drawings.

DETAILED DESCRIPTION

First Embodiment

Figure 1:
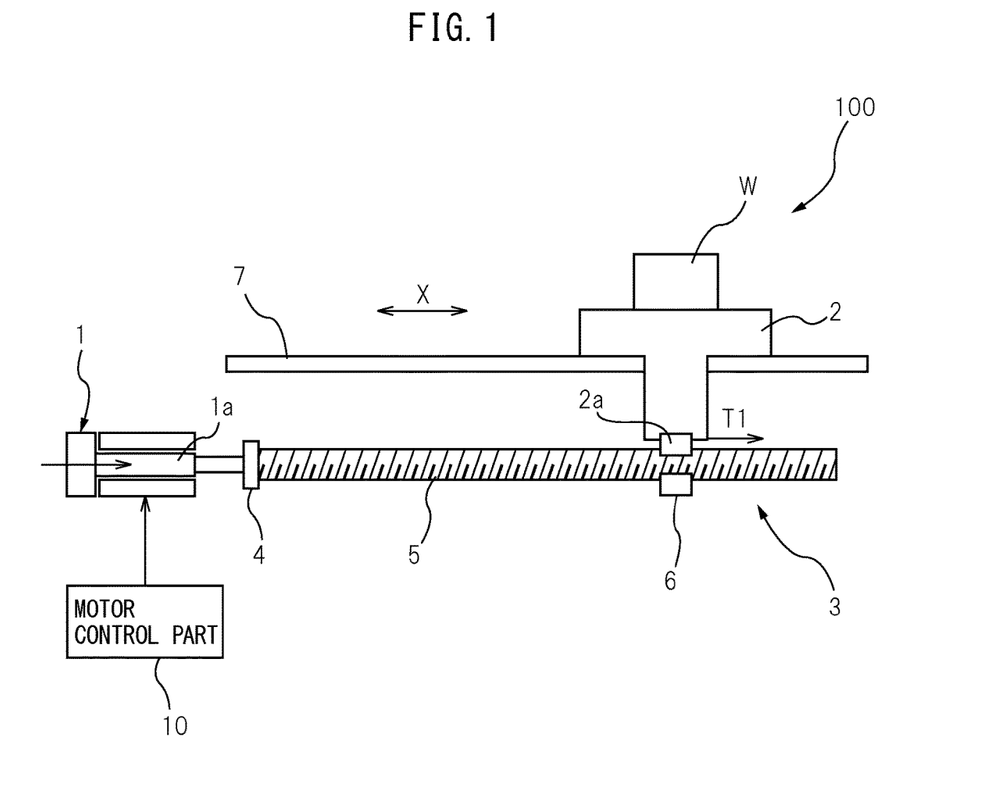
FIG. 1 is a view which shows the schematic configuration of a servo control system according to an embodiment of the present invention.

Below, a servo control system according to a first embodiment of the present invention will be explained with reference to FIG. 1 to FIG. 4. FIG. 1 is a view which shows the schematic configuration of a servo control system 100 according to the first embodiment of the present invention. In the embodiment, the case of applying the servo control system 100 to a machine tool, for example, a vertical machining center, will be explained.

As shown in FIG. 1, the servo control system 100 has a servo motor 1, a table 2 which is driven by the servo motor 1, a coupling mechanism 3 which is coupled to the servo motor 1 and the table 2 and uses the servo motor 1 as a power source to generate a drive force of the table, and a motor control part 10 which controls the servo motor 1. The table 2 can move along a guide 7 in the arrow X-direction. The table 2 carries a workpiece W. In accordance with a machining program, a not shown spindle moves relative to the table 2, whereby a tool which is attached to the front end of the spindle machines the workpiece W. The table 2 has a nut 6 integrally fastened with it. Below, the table 2 will sometimes also be referred to including the nut 6.

A coupling mechanism 3 has a coupling 4 which is coupled to an end of a rotor 1a of the servo motor 1 and a ball screw 5 with one end fastened to the coupling 4. The nut 6 is engaged with the ball screw 5. The motor control part 10 outputs a control signal to the servo motor 1 in accordance with a position command value which commands an X-direction position of the table 2 and rotates the servo motor 1 (rotor 1a). When the servo motor 1 rotates, the ball screw 5 rotates through the coupling 4 and the nut 6 moves along the axial direction of the ball screw 5 (X-direction). That is, rotational motion of the servo motor 1 is converted to linear motion by the ball screw 5. Due to this, the table 2 moves in the X-direction and the position of the table 2 is controlled.

At the time of driving the servo motor 1, the drive force acts on the coupling mechanism 3 and the table 2 and these coupling mechanism 3 and table 2 elastically deform. However, since the coupling mechanism 3 is lower in rigidity compared with the table 2, the elastic deformation of the coupling mechanism 3 accounts for the major part of the overall elastic deformation. If the coupling mechanism 3 elastically deforms, even when rotating the servo motor 1 in accordance with the command value, an error corresponding to the amount of elastic deformation occurs in the position of the table 2. Therefore, in order to eliminate this error, it is necessary to compensate the position command value by the amount of elastic deformation of the coupling mechanism 3. The amount of elastic deformation of the coupling mechanism 3 is proportional to the drive force which acts on the table 2 at the coupling part 2a of the table 2 (nut 6) and the coupling mechanism 3. The drive force can be expressed by the drive torque which acts at the coupling part 2a (below, called the "table drive torque T1"). Considering this point, in the present embodiment, the table drive torque T1 is estimated as explained later and the position command value is compensated in accordance with the table drive torque T1.

In this regard, when driving the servo motor 1, frictional force and other disturbances (disturbance torque) act on the rotor 1a, coupling mechanism 3, and table 2. This disturbance torque changes according to the machining conditions (relative movement speed or relative position, etc. of workpiece W). Therefore, the method of multiplying the torque which the servo motor 1 generates (motor torque T) with a constant to compensate the position command value does not consider the disturbance torque, so when the disturbance torque changes, raising the positional precision of the table 2 is difficult. As opposed to this, the method of compensating the position command value with reference to the table drive torque T1 as in the present embodiment can raise the positional precision of the table 2 even if the disturbance torque changes. Below, this point will be explained.

The relationship between the table drive torque T1 and the motor torque T when driving the servo motor 1 is represented by the following equation (I).

$$T1 = T - T2 \quad (I)$$

T2 of the above equation (I) is the torque (required torque) which is required for driving the servo motor 1 (rotor 1a) and the coupling mechanism 3 (coupling 4, ball screw 5). If subtracting the required torque T2 from the motor torque T, the table drive torque T1 results.

The required torque T2, as shown by the following equation (II), is found by adding the torque (acceleration/deceleration torque Ta) which is required for acceleration and deceleration of the rotor 1a, coupling 4, and ball screw 5 and the disturbance torque Tb which occurs due to friction of the rotor 1a, coupling 4, and ball screw 5, etc.

$$T2 = Ta + Tb \quad (II)$$

From the above equations (I) and (II), the table drive torque T1 is represented by the following equation (III).

$$T1 = T - Ta - Tb \quad (III)$$

From the above equation (III), the table drive torque T1 has the disturbance torque Tb of the rotor 1a, coupling 4, and ball screw 5 as a parameter. Further, if defining the acceleration/deceleration torque which is required for acceleration and deceleration of the table 2 as "Tc" and the disturbance torque which occurs due to friction of the table 2, etc. as "Td", the table drive torque T1 is also represented by the following equation (IV).

$$T1 = Tc + Td \quad (IV)$$

From the above equation (IV), the table drive torque T1 also has the disturbance torque Td of the table 2 as a parameter. Due to the above, by determining the amount of compensation of the position command value with reference to the table drive torque T1, it becomes possible to suitably compensate the position of the table 2 considering the disturbance torques Tb and Td.

Figure 2:
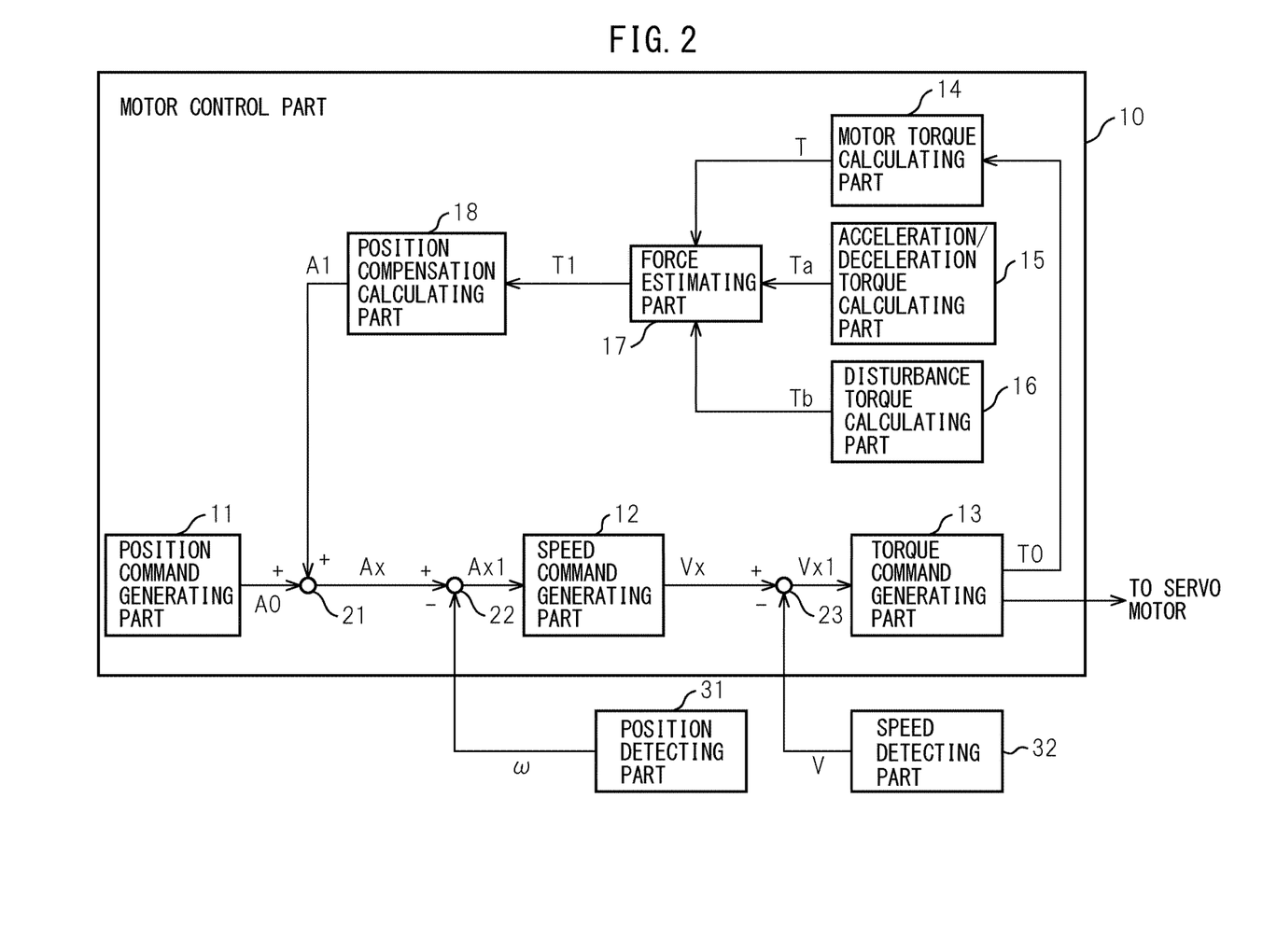
FIG. 2 is a block diagram which shows the configuration of a motor control part which forms part of the servo control system according to a first embodiment of the present invention.

FIG. 2 is a block diagram which shows the configuration of the motor control part 10. The motor control part 10 is configured including a processing system which has a CPU, ROM, RAM, and other peripheral circuits, etc. As shown in FIG. 2, the motor control part 10 has a position command generating part 11, speed command generating part 12, torque command generating part 13, motor torque calculating part 14, acceleration/deceleration torque calculating part 15, disturbance torque calculating part 16, force estimating part 17, and position compensation calculating part 18.

The motor control part 10 are connected to a rotary encoder which detects the rotational angle of the servo motor 1 (angular position ω) or other position detecting part 31 and the speed detecting part 32 which detects the rotational speed V of the servo motor 1. The speed detecting part 32 has a processing function which performs first order differentiation on the angular position ω detected by the position detecting part 31 so as to obtain the rotational speed v. It is also possible to configure the speed detecting part 32 by a speed sensor which directly detects the rotational speed v. Further, when the speed detecting part 32 is configured by a speed sensor which directly detects the rotational speed V, the position detecting part 31 may integrate the rotational speed v which is detected by the speed detecting part 32 so as to obtain the angular position w.

The position command generating part 11 generates a position command value A0 of the table 2 based on a predetermined machining program. This position command value A0 is compensated by the adder 21. That is, the adder 21 adds a position compensation amount A1 calculated by the position compensation calculating part 18 to the position command value A0 and outputs the compensated position command value Ax.

The subtractor 22 subtracts the angular position ω of the servo motor 1 detected by the position detecting part 31 from the position command value Ax and generates the position deviation Ax1. The speed command generating part 12 generates a speed command value Vx in accordance with this position deviation Ax1. That is, the speed command generating part 12 generates the speed command value Vx of the servo motor 1 through the adder 21 and the subtractor 22 based on the position command value A0 and angular position w detected by the position detecting part 31.

The subtractor 23 subtracts the rotational speed V of the servo motor 1 detected by the speed detecting part 32 from the speed command value Vx and outputs a speed deviation Vx1. The torque command generating part 13 generates a torque command value T0 in accordance with this speed deviation Vx1. That is, the torque command generating part 13 generates the torque command value T0 of the servo motor 1 through the subtractor 23, based on the speed command value Vx and the rotational speed V detected by the speed detecting part 32. The control signal corresponding to this torque command value T0 is output to the servo motor 1. The servo motor 1 is controlled so that the torque which the servo motor 1 generates (motor torque T) becomes the torque command value T0.

The motor torque calculating part 14 calculates the motor torque T from the torque command value T0. The torque command value T0 and the motor torque T are equal or substantially equal. Therefore, for example, the torque command value T0 is calculated as the motor torque T.

The acceleration/deceleration torque calculating part 15 calculates the torque for accelerating and decelerating the servo motor 1 (rotor 1a) and the coupling mechanism 3 (coupling 4 and ball screw 5) (acceleration/deceleration torque Ta). The acceleration/deceleration torque Ta is calculated by multiplying the inertia J0 of the rotor 1a, coupling 4, and ball screw 5 with the angular acceleration a0 of the servo motor 1. The inertia J0 is a value inherent to a machine and is stored in advance in the memory of the motor control part 10. The angular acceleration a0 is calculated by performing second order differentiation of the angular position ω detected by the position detecting part 31 or is calculated by performing first order differentiation of the rotational speed V detected by the speed detecting part 32.

The disturbance torque calculating part 16 calculates the disturbance torque Tb which occurs due to the disturbance (friction) which acts on the servo motor 1 (rotor 1a) and the coupling mechanism 3 at the time of driving the servo motor 1. Specifically, the rotational speed V detected by the speed detecting part 32 is multiplied by a predetermined constant k1 to calculate the disturbance torque Tb. The constant k1 is a value which is inherent to a machine and is determined by actually operating the machine in advance or by a simulated calculation, etc.

The force estimating part 17 estimates the table drive torque T1 based on motor torque T which is output by the motor torque calculating part 14, the acceleration/deceleration torque Ta which is output from the acceleration/deceleration torque calculating part 15, and the disturbance torque Tb which is output by the disturbance torque calculating part 16. That is, as shown in the above equation (III), the acceleration/deceleration torque Ta and the disturbance torque Tb are subtracted from the motor torque T and the net table drive torque T1 which acts on the table 2 is calculated.

The position compensation calculating part 18 calculate the position compensation amount A1 of the servo motor 1 based on the table drive torque T1 which is output from the force estimating part 17. Specifically, the table drive torque T1 is multiplied with a predetermined constant k2 to calculate the position compensation amount A1. The constant k2 is a value inherent to a machine and is determined by actually operating the machine in advance or by a simulated calculation, etc. For example, by performing the work of making the table 2 operate in circular motion in advance and changing the constant k2 little by little so that the position of the table 2 or workpiece W at that time matches with the position command value Ax, the optimum constant k2 is determined.

Figure 3:
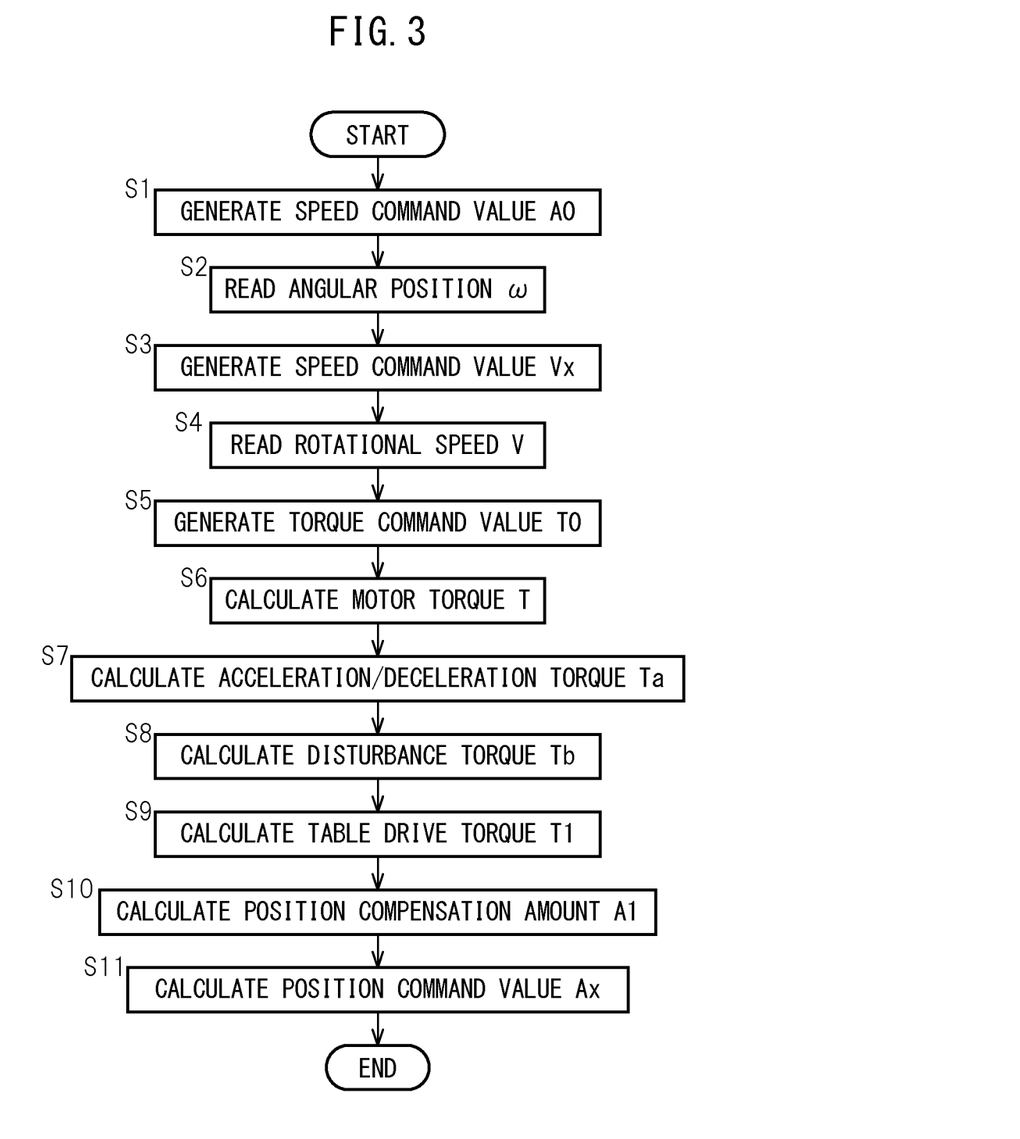
FIG. 3 is a flow chart which shows an example of the processing which is performed by the motor control part of FIG. 2.

The above processing routine at the motor control part 10, in particular the routine for calculation of the position command value Ax, will be explained by a flow chart. FIG. 3 is a flow chart which shows one example of the processing which is performed by the motor control part 10 according to the first embodiment. The processing which is shown in this flow chart is, for example, started when a machining command of the workpiece W is input.

At step S1, the position command generating part 11 generates a position command value A0. At step S2, the angular position ω of the servo motor 1 detected by the position detecting part 31 is read. At step S3, the speed command generating part 12 generates the speed command value Vx of the servo motor 1 based on the position command value A0 and the angular position ω. At step S4, the rotational speed V of the servo motor 1 detected by the speed detecting part 32 is read. At step S5, the torque command generating part 13 generates the torque command value T0 based on the speed command value Vx and the rotational speed V.

At step S6, the motor torque calculating part 14 calculates the motor torque T based on the torque command value T0. At step S7, the acceleration/deceleration torque calculating part 15 multiplies the inertia J0 of the servo motor 1 and the coupling mechanism 3 with the angular acceleration a0 of the servo motor 1 obtained by applying second order differentiation to the angular position ω or first order differentiation to the rotational speed V so as to calculate the acceleration/deceleration torque Ta. At step S8, the disturbance torque calculating part 16 multiplies the rotational speed V with the constant k1 to calculate the disturbance torque Tb.

At step S9, the force estimating part 17 subtracts the acceleration/deceleration torque Ta and the disturbance torque Tb from the motor torque T to calculate the table drive torque T1. At step 10, the position compensation calculating part 18 multiplies the table drive torque T1 with the constant k2 to calculate the position compensation amount A1. At step S11, the adder 21 adds the position compensation amount A1 to the position command value A0 and calculates the compensated position command value Ax.

According to the first embodiment, the following functions and effects can be exhibited.

(1) The motor control part 10 which controls the servo motor 1 has a position command generating part 11 which generates a position command value A0 of the table 2, a force estimating part 17 which estimates the table drive torque T1 which acts on the table 2 at the coupling part 2a of the table 2 and the coupling mechanism 3, and a position compensation calculating part 18 and adder 21 which compensate the position command value A0 based on the estimated table drive torque T1. By compensating the position command value A0 based on the table drive torque T1 in this way, position compensation is performed considering the friction between the servo motor 1 and table 2 and other disturbances Tb and Td. Therefore, even if the machining conditions change and the disturbances Tb and Td greatly change, it is possible to precisely compensate the position command value A0.

(2) The motor control part 10 has a motor torque calculating part 14 which calculates the motor torque T which the servo motor 1 generates and a acceleration/deceleration torque calculating part 15 and a disturbance torque calculating part 16 which calculate the torque T2 which is required for driving the servo motor 1 and coupling mechanism 3, that is, the acceleration/deceleration torque Ta and the disturbance torque Tb. Further, the force estimating part 17 is designed to estimate the table drive torque T1 based on these motor torque T and required torque T2 (=Ta+Tb) (step S9). Due to this, it is possible to determine the table drive torque T1 well by calculation and possible to raise the positional precision of the table 2.

(3) The position compensation calculating part 18 multiplies the table drive torque T1 estimated by the force estimating part 17 with a predetermined constant k2 to calculate the compensation amount A1 of the position command value A0 (step S10). Here, the constant k2 is a value inherent to a machine. The amount of compensation can be determined precisely for each machine from the table drive torque T1.

(4) The servo control system 100 is provided with a position detecting part 31 which detects the angular position ω of the servo motor 1 and a speed detecting part 32 which detects the speed V of the servo motor 1. The motor control part 10 further has a speed command generating part 12 which generates the speed command value Vx of the servo motor 1 based on the position command value A0 which is generated by the position command generating part 11 and the position detection value w which is detected by the position detecting part 31, and a torque command generating part 13 which generates the torque command value T0 of the servo motor 1 based on the speed command value Vx which is generated by the speed command generating part 12 and the speed detection value V which is detected by the speed detecting part 32. Further, the motor torque calculating part 14 calculates the motor torque T based on the generated torque command value T0 (step S6). Due to this, it is possible to precisely determine the motor torque T and raise the positional precision of the table 2.

Figure 4:
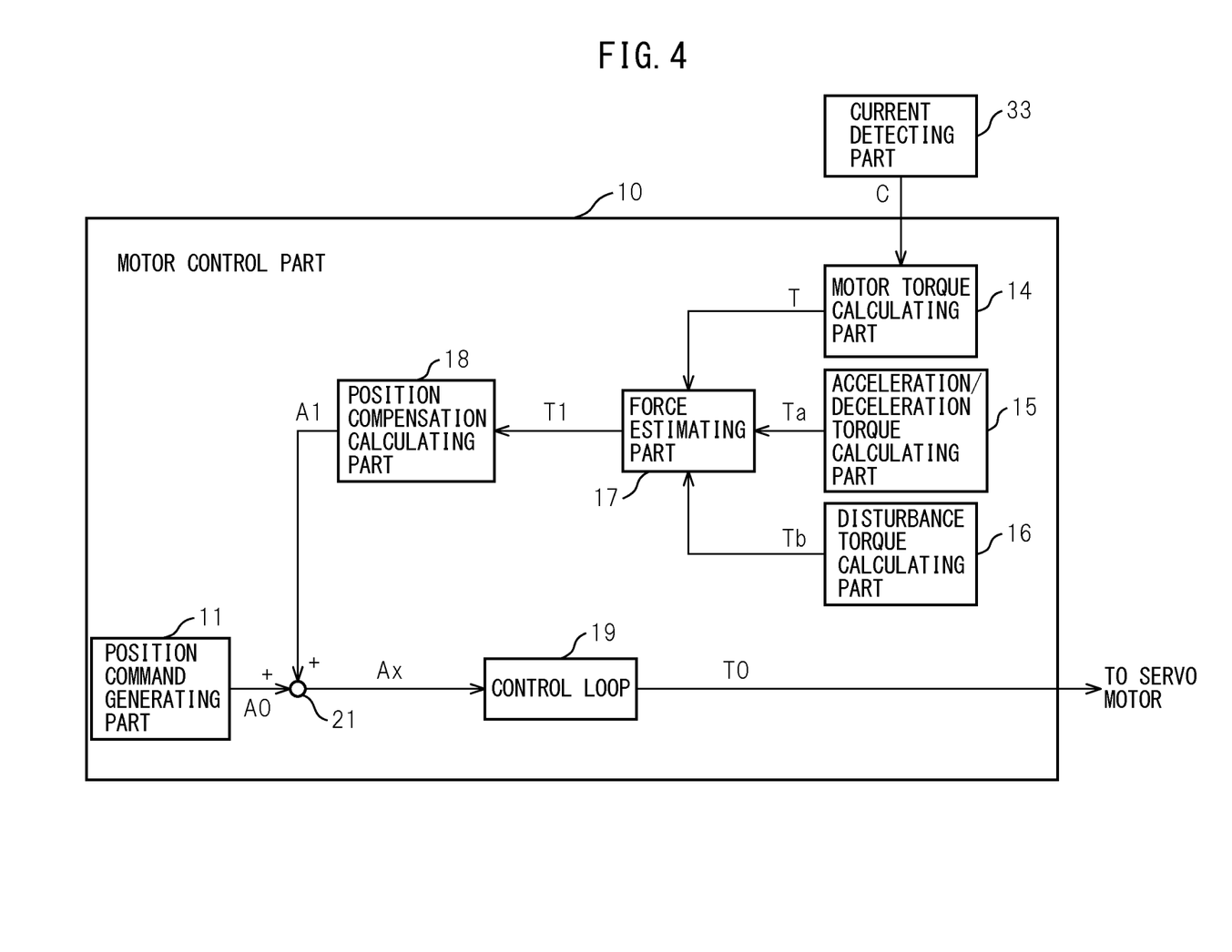
FIG. 4 is a view which shows a modification of FIG. 2.

In the above first embodiment, the motor torque calculating part 14 calculates the motor torque T based on the torque command value T0. However, since the motor torque T has a correlative relationship with the current which flows to the servo motor 1 (motor current C), the motor torque T may also calculated based on the motor current C. FIG. 4 is a block diagram which shows one example of such a configured motor control part 10. In FIG. 4, the parts which output the control signal (torque command value T0) to the servo motor 1 based on the position command value Ax, that is, the parts which correspond to the speed command generating part 12 and the torque command generating part 13, are shown together as the control loop 19.

As shown in FIG. 4, a current detecting part 33 which detects the motor current C is connected to the motor control part 10. The motor torque calculating part 14 multiplies the motor current C which is detected by the current detecting part 33 and a predetermined torque constant k3 and thereby calculates the motor torque T.

In the above first embodiment, although the force estimating part 17 estimates the table drive torque T1 based on the motor torque T, and the acceleration/deceleration torque Ta and disturbance torque Tb of the servo motor 1 and coupling mechanism 3, the disturbance torque Tb may also be ignored. In this case, the force estimating part 17 may estimate the table drive torque T1 based on the motor torque T and the acceleration/deceleration torque Ta, i.e., by subtracting the acceleration/deceleration torque Ta from the motor torque T.

Second Embodiment

Figure 5:
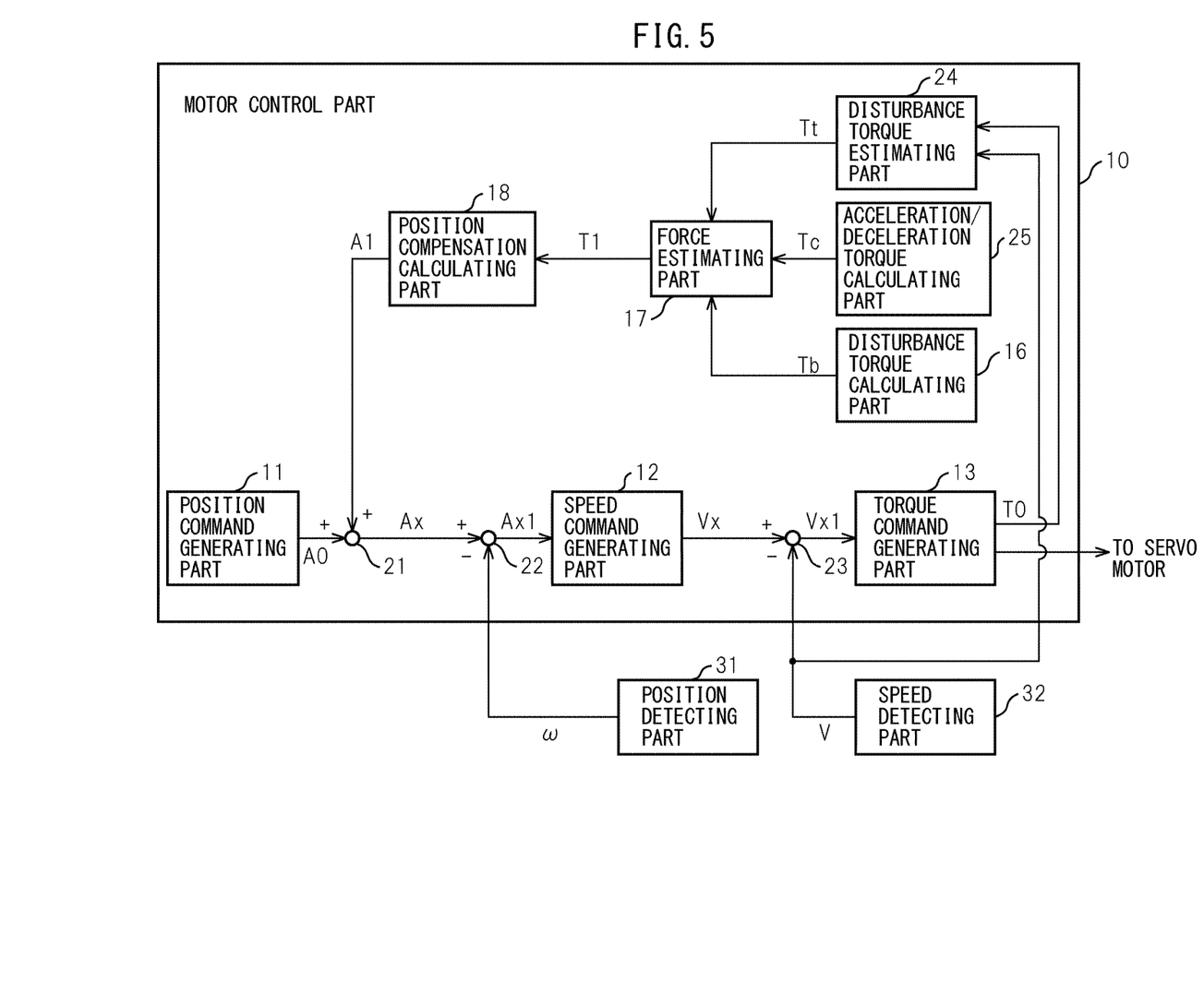
FIG. 5 is a block diagram which shows the configuration of a motor control part which forms part of the servo control system according to a second embodiment of the present invention.
Figure 6:
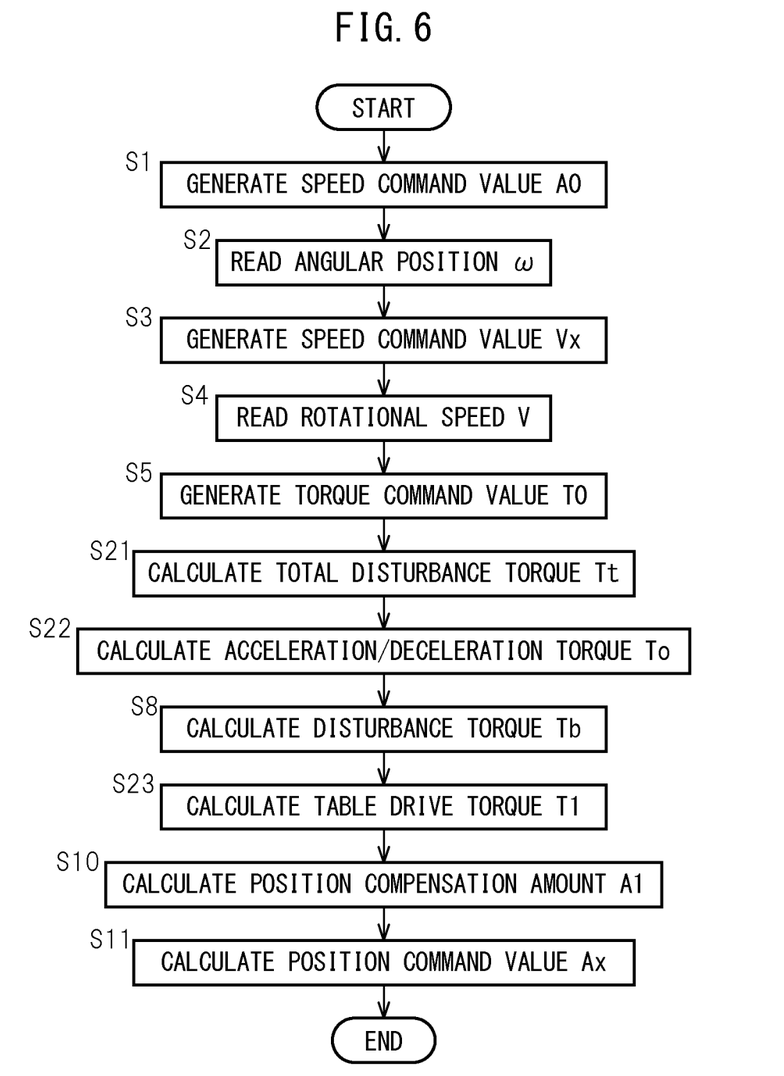
FIG. 6 is a flow chart which shows an example of the processing which is performed by the motor control part of FIG. 5.

Referring to FIG. 5 and FIG. 6, a second embodiment of the present invention will be explained. The second embodiment differs from the first embodiment in the configuration of the motor control part 10. FIG. 5 is a block diagram which shows the configuration of the motor control part 10 which forms part of the servo control system 100 according to the second embodiment. Locations the same as FIG. 2 are assigned the same reference notations. Below, the points different from the first embodiment will mainly be explained.

As shown in FIG. 5, the motor control part 10 has a position command generating part 11, speed command generating part 12, torque command generating part 13, disturbance torque calculating part 16, disturbance torque estimating part 24, acceleration/deceleration torque calculating part 25, force estimating part 17, and position compensation calculating part 18. That is, instead of the motor torque calculating part 14 and the acceleration/deceleration torque calculating part 15, the point of provision of the disturbance torque estimating part 24 and the acceleration/deceleration torque calculating part 25 differs from the first embodiment (FIG. 2).

The disturbance torque estimating part 24 estimates the disturbance torque Tt which occurs due to disturbance (friction, etc.) which acts on the servo motor 1 (rotor 1a), coupling mechanism 3, and table 2. This disturbance torque Tt is the torque which is comprised of the disturbance torque Tb of the rotor 1a and coupling mechanism 3 and the disturbance torque Td of the table 2 added together and corresponds to the overall disturbance torque which acts on the servo motor 1 (called "total disturbance torque"). The total disturbance torque Tt can be determined using an observer from the rotational speed V of the servo motor 1 which is detected by the speed detecting part 32 and the torque command value T0 which is output from the torque command generating part 13.

The acceleration/deceleration torque calculating part 25 calculates the torque for accelerating and decelerating the table 2 (acceleration/deceleration torque Tc). The acceleration/deceleration torque Tc is calculated by multiplying the inertia J2 of the table 2 with respect to the center of rotation of the ball screw 5 with the angular acceleration a2 of the table 2 with respect to the center of rotation of the ball screw 5. The inertia J2 is a value which is inherent to a motor and is stored in advance in the memory of the motor control part 10. The angular acceleration a2 assumes that a2=a0 (angular acceleration of servo motor 1) approximately stands and can be calculated by applying second order differentiation to the angular position ω which is detected by the position detecting part 31. A numerical equation model (for example, two inertia model) can also be used to calculate the angular acceleration a2.

The force estimating part 17 estimates the table drive torque T1 based on the total disturbance torque Tt which is output by the disturbance torque estimating part 24, the acceleration/deceleration torque Tc which is output by the acceleration/deceleration torque calculating part 25, and the disturbance torque Tb which is output by the disturbance torque calculating part 16. That is, the following equation (V) in which (Tt−Tb) is entered into the disturbance torque Td of the above equation (IV) is used to calculate the table drive torque T1.

$$T1 = Tt + Tc - Tb \quad (V)$$

FIG. 6 is a flow chart which shows an example of the processing which is performed by the motor control part 10 according to the second embodiment. Locations the same as FIG. 3 are assigned the same reference notations.

As shown in FIG. 6, at step S21, the disturbance torque estimating part 24 calculates the total disturbance torque Tt. That is, the disturbance torque estimating part 24 calculates the total disturbance torque Tt using an observer from the rotational speed V of the servo motor 1 and torque command value T0. At step S22, the acceleration/deceleration torque calculating part 25 multiplies the inertia J2 of the table 2 with the angular acceleration a2 with respect to the center of rotation of the ball screw 5 of the table 2 so as to calculate the acceleration/deceleration torque Tc. At step S23, the force estimating part 17 adds the acceleration/deceleration torque Tc to the disturbance torque Tt and subtracts the disturbance torque Tb to calculate the table drive torque T1.

According to the second embodiment, the motor control part 10 has a disturbance torque estimating part 24 which estimates the total disturbance torque T1 which occurs due to the disturbances Tb, Td which act on the servo motor 1, coupling mechanism 3, and table 2, and the force estimating part 17 estimates the table drive torque T1 based on the total disturbance torque Tt (step S23). Due to this, it is possible to estimate well the table drive torque T1 considering the disturbance torques Tb, Td without determining the motor torque T.

Further, the motor control part 10 has an acceleration/deceleration torque calculating part 25 which calculates the acceleration/deceleration torque Tc which is required for acceleration and deceleration of the table 2 and a disturbance torque calculating part 16 which calculates the disturbance torque Tb, and the force estimating part 17 estimates the table drive torque T1 based on the total disturbance torque Tt which is estimated by the disturbance torque estimating part 24, the acceleration/deceleration torque Tc, and the disturbance torque Tb. Due to this, it is possible to determine the table drive torque T1 well by calculation and possible to raise the positional precision of the table 2. The disturbance torque estimating part 24 calculates the total disturbance torque Tt based on the speed detection value V which is detected by the speed detecting part 32 and the torque command value T0 which is generated by the torque command generating part 13 (step S21). Therefore, it is possible to precisely determine the overall disturbance torque Tt which acts on the servo motor 1.

In the above second embodiment, although the force estimating part 17 estimates the table drive torque T1 based on the total disturbance torque Tt, acceleration/deceleration torque Tc of the table 2, and disturbance torque Tb of the servo motor 1 and coupling mechanism 3, the disturbance torque Tb may also be ignored. In this case, the force estimating part 17 may estimate the table drive torque T1 based on the total disturbance torque Tt and acceleration/deceleration torque Tc, that is, by adding the acceleration/deceleration torque Tc to the total disturbance torque Tt.

Third Embodiment

Figure 7:
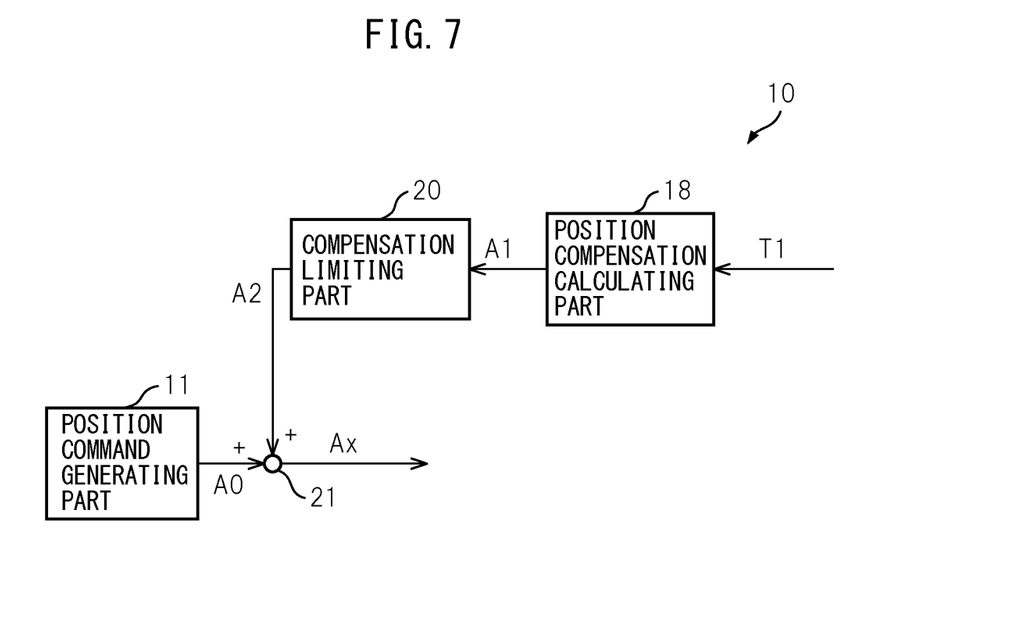
FIG. 7 is a block diagram which shows the principal configuration of a motor control part which forms part of a servo control system according to a third embodiment of the present invention.

Referring to FIG. 7, a third embodiment of the present invention will be explained. In the first and second embodiments, the constant k2 is multiplied with the table drive torque T1 to calculate the position compensation amount A1 and the position compensation amount A1 is added to the position command value A0 to compensate the position command value A0. However, if the compensation amount A1 is too large, the machined surface of the workpiece W is liable to be scratched or otherwise good machining results are liable to be unable to be obtained. The size of the position compensation amount A1 is limited considering this point in the third embodiment. Below, the points of difference of the first and second embodiments will mainly be explained.

FIG. 7 is a block diagram which shows the principal configuration of the motor control part 10 according to the third embodiment. Locations the same as FIG. 2 and FIG. 5 are assigned the same reference notations. As shown in FIG. 7, the motor control part 10 has a compensation limiting unit 20. The position compensation amount A1 which is calculated by the position compensation calculating part 18 is input to the compensation limiting unit 20. In the memory of the motor control part 10, limit values of the position compensation amount A1, that is, an upper limit value Amax and a lower limit value Amin are set in advance.

The compensation limiting unit 20 compares these upper limit value Amax and lower limit value Amin and the position compensation amount A1. If Amin≤A1≤Amax, the position compensation amount A1 is output as the position compensation amount A2. On the other hand, when the position compensation amount A1 is larger than the upper limit value Amax, the upper limit value Amax is output as the position compensation amount A2, while when the position compensation amount A1 is smaller than the lower limit value Amin, the lower limit value Amin is output as the position compensation amount A2. The adder 21 adds the position compensation amount A2 to the position command value A0 to compensate the position command value A0.

The upper limit value Amax and the lower limit value Amin are set with reference to the amount of backlash B of the coupling mechanism 3 (ball screw 5). For example, the value of the amount of backlash B multiplied with a predetermined constant k4 (for example, 1) is set as the upper limit value Amax, while the value of the amount of backlash multiplied with a predetermined constant k5 (for example, −1) is set as the lower limit value Amin. When the coupling mechanism 3 is low in rigidity, the constant k4 may be made a value larger than 1 and the constant k5 may be made a value smaller than −1.

In this way, in the third embodiment, the compensation limiting part 20 limits the position compensation amount A1, so the position compensation amount A2 can be kept down to a predetermined range and a good workpiece W free of scratches at the machined surface can be machined.

Modifications

Figure 8:
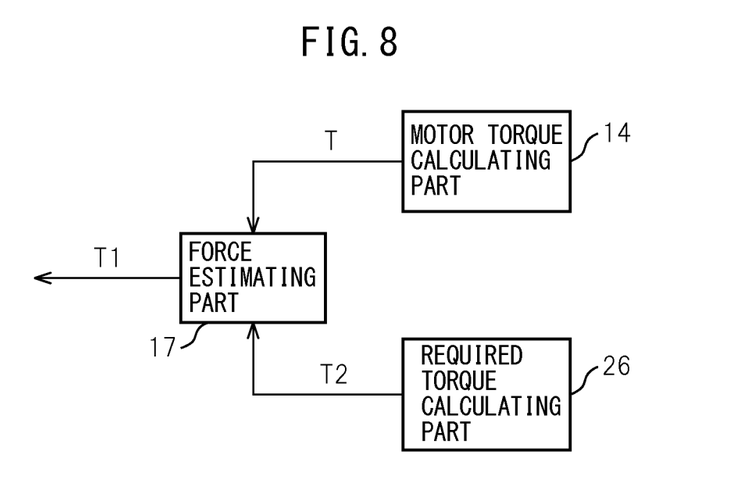
FIG. 8 is a view which shows a modification of FIG. 2.

In the above embodiments (FIG. 2, FIG. 4), the force estimating part 17 estimates the table drive torque T1 based on the motor torque T, acceleration/deceleration torque Ta, and disturbance torque Tb. In the above embodiments (FIG. 5), the force estimating part 17 estimates the table drive torque T1 based on the total disturbance torque Tt, acceleration/deceleration torque Tc, and disturbance torque Tb. However, so long as estimating the table drive torque T1 (drive force) which acts on the table 2, the force estimating part 17 is not limited to the above configuration. For example, as shown in FIG. 8, instead of the acceleration/deceleration torque calculating part 15 and disturbance torque calculating part 16 of FIG. 2, it is possible to provide a required torque calculating part 26 which calculates the required torque T2 which is required for driving the servo motor 1 and coupling mechanism 3, that is, the sum of the acceleration/deceleration torque Ta and the disturbance torque Tb constituting the required torque T2, and the force estimating part 17 may estimate the table drive torque T1 based on the motor torque T and the required torque T2.

In the above embodiments, the processing at the position compensation calculating part 18 and the adder 21 are used to compensate the position command value A0. However, so long as compensating the position command value A0 based on the table drive torque T1 which is estimated by the force estimating part 17, the compensating part is also not limited in configuration to the above one. In the above embodiments, the control signal is output to the servo motor 1 through the speed command generating part 12 and the torque command generating part 13 to which the compensated position command value Ax is input (FIG. 2, FIG. 5) or through the control loop 19 (FIG. 4). However, as long as a control signal is outputted to the servo motor 1 based on the compensated position command value Ax, the control signal output part may be configured in any way.

Figure 9A:
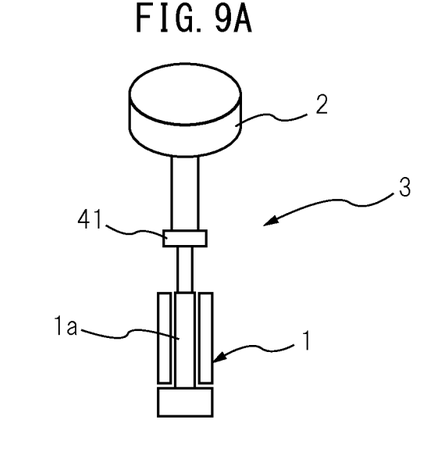
FIG. 9A is a view which shows a modification of the coupling mechanism of FIG. 1.
Figure 9B:
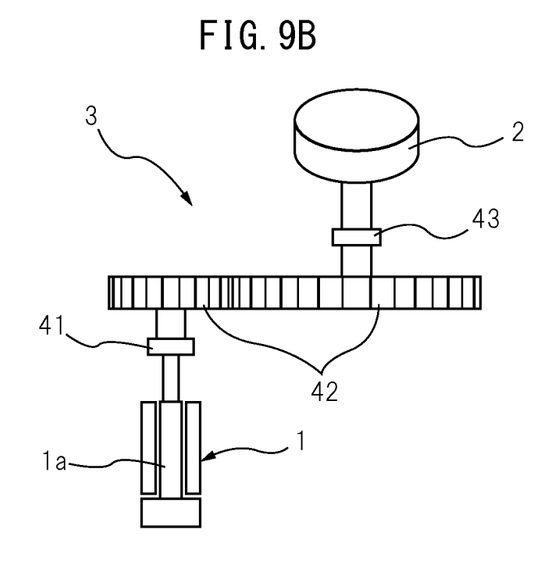
FIG. 9B is a view which shows a modification of the coupling mechanism of FIG. 1.

The coupling mechanism which is coupled with the servo motor 1 and the table 2 is not limited in configuration to the above. FIG. 9A and FIG. 9B are views which show modifications of the coupling mechanism 3. In FIG. 9A, the servo motor 1 is coupled through the coupling 41 to the table 2. The coupling 41 forms the coupling mechanism 3. On the other hand, in FIG. 9B, the servo motor 1 is coupled through the coupling 41, deceleration mechanism 42 (deceleration gear), and coupling 43 to the table 2. The couplings 41, 43 and the deceleration mechanism 42 form the coupling mechanism 3. In this way, if including any of the ball screw 5 (FIG. 1), deceleration mechanism 42, and couplings 4, 41, 43, the deceleration mechanism 3 can be configured in any way.

In the above embodiments, although the table 2 is coupled with the coupling mechanism 3, the driven member which is driven by the servo motor 1 may also be configured by something other than the table 2. Further, the motor control system 100 of the present invention can be similarly applied to a horizontal machining center or other machine tool or something other than a machine tool.

The above embodiments can be freely combined with one or more of the modifications.

According to the present invention, the system estimates the drive force which acts on the driven member and compensates the position command value of the driven member based on this drive force, so it is possible to precisely compensate the position command value without regard as to disturbance between the servo motor and the driven member.

While the present invention has been described with reference to the preferred embodiments thereof, those skilled in the art would understand that various modifications and changes may be made thereto without departing from the scope of the appended claims.

The invention claimed is:

1. A servo control system, comprising:
   a servo motor;
   a table configured to be driven by the servo motor;
   a coupling mechanism coupled with the servo motor and the table, the coupling mechanism configured to use the servo motor as a power source to generate a table drive torque acting on the table at a coupling part of the table and the coupling mechanism; and
   a motor control part configured to control the servo motor, wherein
   the motor control part comprises
      a position command generating part configured to generate a position command value of the table,
      a force estimating part configured to estimate the table drive torque acting on the table at the coupling part,
      a compensating part configured to compensate the position command value generated by the position command generating part based on the table drive torque estimated by the force estimating part,
      a control signal output part configured to output a control signal to the servo motor based on a position command value compensated by the compensating part,
      a disturbance torque estimating part configured to estimate a total disturbance torque occurring due to a disturbance acting on the servo motor, the coupling mechanism, and the table,
      an acceleration/deceleration torque calculating part configured to
         calculate angular acceleration of the servo motor based on an angular position of the servo motor or a detected value of a rotational speed of the servo motor, and
         calculate an acceleration/deceleration torque required for acceleration or deceleration of the table based on the calculated angular acceleration, and
      a disturbance torque calculating part configured to calculate a disturbance torque occurring due to a disturbance acting on the servo motor and the coupling mechanism based on the detected value of the rotational speed of the servo motor,
   wherein
   the force estimating part is configured to estimate the table drive torque by subtracting the disturbance torque calculated by the disturbance torque calculating part from a sum of
      the total disturbance torque estimated by the disturbance torque estimating part, and
      the acceleration/deceleration torque calculated by the acceleration/deceleration torque calculating part.

2. The servo control system according to claim 1, wherein the compensating part is configured to multiply a predetermined constant with the table drive torque estimated by the force estimating part to compensate the position command value.

3. The servo control system according to claim 1, wherein the compensating part comprises a compensation limiting part configured to limit an amount of compensation of the position command value.

4. The servo control system according to claim 1, further comprising
   a position detecting part configured to detect the angular position of the servo motor, and
   a speed detecting part configured to detect the rotational speed of the servo motor, wherein
   the motor control part further comprises
      a speed command generating part configured to generate a speed command value of the servo motor based on the position command value generated by the position command generating part and the angular position detected by the position detecting part, and
      a torque command generating part configured to generate a torque command value of the servo motor based on the speed command value generated by the speed command generating part and the rotational speed detected by the speed detecting part, and
   the disturbance torque estimating part is configured to estimate the total disturbance torque based on
      the rotational speed detected by the speed detecting part, and
      the torque command value generated by the torque command generating part.

5. The servo control system according to claim 1, wherein the coupling mechanism includes at least one of a ball screw, deceleration mechanism, and coupling.

6. A servo control system, comprising:
   a servo motor;
   a driven member configured to be driven by the servo motor;
   a coupling mechanism coupled with the servo motor and the driven member, the coupling mechanism configured to use the servo motor as a power source to generate a drive force acting on the driven member at a coupling part of the driven member and the coupling mechanism; and
   a motor control part configured to control the servo motor, wherein
   the motor control part comprises
      a position command generating part configured to generate a position command value of the driven member, a force estimating part configured to estimate the drive force acting on the driven member at the coupling part, a compensating part configured to compensate the position command value generated by the position command generating part based on the drive force estimated by the force estimating part, a control signal output part configured to output a control signal to the servo motor based on a position command value compensated by the compensating part, a disturbance torque estimating part configured to estimate a total disturbance torque occurring due to a disturbance acting on the servo motor, the coupling mechanism, and the driven member, an acceleration/deceleration torque calculating part configured to calculate angular acceleration of the servo motor based on an angular position of the servo motor or a detected value of a rotational speed of the servo motor, and calculate an acceleration/deceleration torque required for acceleration or deceleration of the driven member based on the calculated angular acceleration, and a disturbance torque calculating part configured to calculate a disturbance torque occurring due to the disturbance acting on the servo motor and the coupling mechanism based on the detected value of the rotational speed of the servo motor, and the force estimating part is configured to estimate the drive force by subtracting the disturbance torque calculated by the disturbance torque calculating part from a sum of the total disturbance torque estimated by the disturbance torque estimating part, and the acceleration/deceleration torque calculated by the acceleration/deceleration torque calculating part.

\* \* \* \* \*